United States Patent
Katsuda et al.

(10) Patent No.: US 7,758,070 B2
(45) Date of Patent: Jul. 20, 2010

(54) INFLATOR FOR RESTRAINING SYSTEM FOR VEHICLE

(75) Inventors: Nobuyuki Katsuda, Tatsuno (JP); Mikio Yabuta, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 155 days.

(21) Appl. No.: 12/071,273

(22) Filed: Feb. 19, 2008

(65) Prior Publication Data
US 2008/0203715 A1 Aug. 28, 2008

Related U.S. Application Data

(60) Provisional application No. 60/891,432, filed on Feb. 23, 2007.

(30) Foreign Application Priority Data
Feb. 20, 2007  (JP) ............................. 2007-039091

(51) Int. Cl.
*B60R 21/26* (2006.01)
(52) U.S. Cl. ................. 280/736; 280/740; 280/741; 280/742
(58) Field of Classification Search ............. 280/730.2, 280/736, 737, 741, 742, 740; *B60R 21/26, B60R 21/264, 21/268, 21/272*
See application file for complete search history.

(56) References Cited

U.S. PATENT DOCUMENTS

RE28,624 E * 11/1975 Lewis et al. ................. 280/736
4,114,924 A * 9/1978 Kasagi et al. ............... 280/740
5,230,531 A 7/1993 Hamilton et al.
5,472,229 A * 12/1995 Bishop et al. ............ 280/728.2
5,573,271 A 11/1996 Headley (Continued)

FOREIGN PATENT DOCUMENTS
DE        100 33 319 A1      1/2002

(Continued)

OTHER PUBLICATIONS

NPT—National Pipe Thread Taper—ANSI B1.20.1 Standard (www.engineeringtoolbox.com) Apr. 8, 2006, [online], [retrieved on Sep. 12, 2009]. Retrieved from the Internet Archive: <URL:web.archive.org/web/20060408231925/http://www.engineeringtoolbox.com/npt-national-pipe-taper-threads-d_750.html>.*

*Primary Examiner*—Ruth Ilan
*Assistant Examiner*—Barry Gooden, Jr.
(74) *Attorney, Agent, or Firm*—Birch, Stewart, Kolasch & Birch, LLP (57) ABSTRACT

An inflator for a restraining system for a vehicle includes:
  an inflator housing storing a gas generation source,
  a diffuser having a plurality of gas discharge holes for discharging gas provided within the inflator housing,
  a gas discharge channel member including a gas outlet port and being attached to cover an outer surface of the diffuser,
  the gas discharge channel member having a gas-introducing port communicating with at least one of the gas discharge holes and a pin-introducing port communicating with at least one of the remaining gas discharge holes, and
  the diffuser and the gas discharge channel member, fixed by a fixing pin inserted into both of the at least one of the remaining gas discharge holes and the pin-introducing port.

11 Claims, 4 Drawing Sheets (a)           (b)

U.S. PATENT DOCUMENTS

| | | | | |
|---|---|---|---|---|
| 5,678,856 A * | 10/1997 | Headley | | 280/737 |
| 5,762,360 A * | 6/1998 | Damman et al. | | 280/728.2 |
| 6,152,484 A | 11/2000 | Fischer et al. | | |
| 6,179,323 B1 * | 1/2001 | Shellabarger | | 280/730.1 |
| 6,247,725 B1 * | 6/2001 | Moller | | 280/737 |
| 6,318,754 B1 | 11/2001 | Einsiedel et al. | | |
| 7,293,797 B2 * | 11/2007 | Nakayasu et al. | | 280/737 |
| 7,347,449 B2 * | 3/2008 | Rossbach et al. | | 280/737 |
| 2003/0057689 A1 | 3/2003 | Katsuda et al. | | |
| 2003/0197357 A1 | 10/2003 | Heigl et al. | | |
| 2004/0090049 A1 * | 5/2004 | McCann et al. | | 280/728.2 |
| 2005/0012309 A1 | 1/2005 | Blackson et al. | | |
| 2005/0161922 A1 * | 7/2005 | Bilbrey et al. | | 280/736 |
| 2005/0161923 A1 | 7/2005 | Hirooka et al. | | |
| 2005/0173906 A1 * | 8/2005 | Nakayasu et al. | | 280/737 |
| 2005/0200103 A1 * | 9/2005 | Burns et al. | | 280/730.2 |
| 2005/0242556 A1 * | 11/2005 | Katsuda et al. | | 280/737 |
| 2006/0038388 A1 * | 2/2006 | Einsiedel | | 280/736 |
| 2006/0043714 A1 * | 3/2006 | Mramor et al. | | 280/736 |
| 2006/0097490 A1 * | 5/2006 | Seidl et al. | | 280/728.2 |
| 2006/0261583 A1 * | 11/2006 | Debler et al. | | 280/740 |
| 2007/0075536 A1 * | 4/2007 | Kelley et al. | | 280/737 |
| 2007/0267855 A1 * | 11/2007 | Lewis et al. | | 280/739 |
| 2008/0023949 A1 * | 1/2008 | Webber et al. | | 280/737 |
| 2010/0007123 A1 * | 1/2010 | Cord et al. | | 280/741 |

FOREIGN PATENT DOCUMENTS

| | | |
|---|---|---|
| DE | 202 06 340 U1 | 8/2002 |
| DE | 103 285 62 A1 | 1/2005 |
| EP | 0 976 624 A2 | 2/2000 |
| JP | 11-255064 A | 9/1999 |
| JP | 2003-011769 | 1/2003 |
| JP | 2005-178643 | 7/2005 |

* cited by examiner

INFLATOR FOR RESTRAINING SYSTEM FOR VEHICLE

This nonprovisional application claims priority under 35 U.S.C. §119(a) based on Patent Application No. 2007-039091 filed in Japan on 20 Feb. 2007 and 35 U.S.C. §119(e) based on U.S. Provisional Application No. 60/891,432 filed on 23 Feb. 2007, which are incorporated by reference.

BACKGROUND OF INVENTION

1. Field of Invention

The present invention relates to an inflator for an air bag to be installed on a vehicle or to an inflator for a restraining system for use in a pedestrian protection device.

2. Description of Related Art

Examples of restraining devices for motor vehicles include airbag apparatuses for a driver side and a passenger side next to the driver, an airbag apparatus for side collision, a curtain airbag apparatus, a knee bolster apparatus, an inflatable seatbelt device, and also devices attached outside the vehicle for protecting pedestrians. Inflators that actuate these devices sometimes use a separate connection member for connection to the restraining device such as an airbag, and it is preferred that the connection member have as simple a structure as possible and be connected by a simple process.

For example, a structure of inflator for a side collision airbag or a curtain airbag is known in which, with consideration for a mounting space in the vehicle, the entire housing is formed to have an elongated shape, and a gas discharge hole is provided in the circumferential direction at one end thereof. With such structure, the gas generated therein is introduced in the above airbags via a connection tube.

A gas generator of JP-A No. 11-255064 illustrates a method of connecting the connection tube and the gas discharge port. In the gas generator of JP-A No. 11-255064, a seal 17 is attached, from the outer side thereof, to a gas outlet opening 3 formed in the outer circumferential surface of the housing 13, and then shells 7, 9 are attached from the outside of the seal. A plurality of protrusions 19 is formed at the inner surface of the seal 17, and the protrusion 19 is inserted into the gas outlet opening 3, thereby fixing the seal. A pipeline 5 serving as a flow pipe to the bag is inserted into the seal 17, the shells 7, 9 are tightened with a connection member, and the housing 13 and the pipeline 5 are maintained in an air-tight state. Thus, the member connecting the inflator and the airbag is composed of a large number of components and the assembly process is complicated.

SUMMARY OF INVENTION

The present invention provides an inflator for a restraining system for a vehicle including:
   an inflator housing storing a gas generation source,
   a diffuser having a plurality of gas discharge holes for discharging gas provided within the inflator housing,
   a gas discharge channel member including a gas outlet port and being attached to cover an outer surface of the diffuser,
   the gas discharge channel member having a gas-introducing port communicating with at least one of the gas discharge holes and a pin-introducing port communicating with at least one of the remaining gas discharge holes, and
   the diffuser and the gas discharge channel member, fixed by a fixing pin inserted into both of the at least one of the remaining gas discharge holes and the pin-introducing port.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

The present invention provides an inflator that has a structure in which an inflator body is assembled with a connection member serving as a gas passage for discharging gas from the inflator, this structure being simple and easy to assemble.

The gas located inside the inflator housing passes through the gas discharge holes of the diffuser, passes through an inner channel of the gas discharge channel member attached to the diffuser, and is discharged from the gas outlet port (final gas discharge port that is linked to the airbag or the like) to inflate the airbag. During storage or transportation, the gas discharge channel member is separated from the diffuser, and with consideration for canceling the propulsion when the inflator is erroneously activated, it is preferred that a plurality of gas discharge holes be formed with a uniform intervals in the circumferential direction of the diffuser.

At least one of the gas discharge holes of the diffuser is connected to the gas-introducing port of the gas discharge channel member and serves as a gas discharge path. At least one of the remaining gas discharge holes is connected to the pin-introducing port, and the diffuser and the gas discharge channel member are connected and fixed by inserting the fixing pin through these gas discharge hole and the pin-introducing port. The connection and fixing may be also performed by connecting a plurality of gas discharge holes with an equal number of pin-introducing ports and inserting fixing pins thereinto.

The fixing pin may be in the form of a thread-free bolt (to be press-inserted into the hole), a bolt that has a thread at the distal end thereof and can be screwed (the corresponding thread is formed at least in the gas discharge hole), and a rod such as a rivet that is inserted into the hole followed by flattening the portion protruding from the hole.

In accordance with the present invention, the diffuser and the gas discharge channel member are connected merely by inserting the fixing pin. Therefore, the structure of the connection portion can be simplified, and the connection operation is also simple.

The gas generation source may use a pressurized gas such as argon or helium, a gas generating agent that generates gas in combustion, or a combination thereof. When a pressurized gas is used as a gas generation source, member (well-known igniter or the like) for breaking a rupture plate as a blocking member is accommodated, and when a gas generating agent is used as the gas generation source, a well-known igniter is accommodated.

The diffuser may be connected to one end portion of the inflator housing or may be connected to the central portion in the axial direction, or the like.

The invention preferably provides the inflator for a restraining system for a vehicle, wherein the diffuser has at least one gas discharge hole, preferably one gas discharge hole, formed at each of two opposing locations.

One of the two gas discharge holes communicates with the gas-introducing hole of the gas discharge channel member, and the other gas discharge hole communicates with the pin-introducing port.

The invention preferably provides the inflator for a restraining system for a vehicle, wherein the diffuser has three or more gas discharge holes;

an annular gas passage is formed in a circumferential direction between the diffuser and the gas discharge channel member; and the annular gas passage communicates with gas discharge holes other than the gas discharge hole into which the fixing pin is inserted.

One of the three or more gas discharge holes directly communicates with the gas-introducing port of the gas discharge channel member, and one of the other gas discharge holes communicates with the pin-introducing port. The remaining one or two or more gas discharge holes communicate, via the annular gas passage, with the gas discharge hole that communicates with the gas-introducing port. Alternatively, all the gas discharge holes, except the gas discharge hole that communicates with the pin-introducing port, communicate with the gas-introducing hole via the annular gas passage, rather that communicating directly with the gas-introducing port.

As a result, the entire gas discharged from the gas discharge holes, except the gas discharge hole that communicates with the pin-introducing port, flows into the gas discharge channel member through the gas-introducing port and is discharged from the gas outlet port. The diameter of the annular gas passage is preferably larger than the diameter of the gas discharge hole.

By thus providing the annular gas passage, it is possible to discharge gas from a plurality of gas discharge holes. Therefore, the gas discharge time can be shortened.

The invention preferably provides the inflator for a restraining system for a vehicle, wherein, in the surface where the outer surface of the diffuser and the inner surface of the gas discharge channel member are in contact with each other, one or two or more annular grooves that are continuous in a circumferential direction are formed in one of the outer surface of the diffuser and the inner surface of the gas discharge channel member, and a sealing material is disposed in each of the annular grooves.

The annular groove is formed in one of the outer surface of the diffuser and the inner surface of the gas discharge channel member or in both surfaces, and a sealing member such as an O-ring is inserted therein. As a result, air tightness at the contact surface of the diffuser and the gas discharge channel member is increased and gas leak is prevented.

The invention preferably provides the inflator for a restraining system for a vehicle, wherein the diameter of the gas discharge hole of the diffuser is less than the diameter of the gas-introducing port of the gas discharge channel member communicating with the gas discharge hole.

With such relationship, gas easily flows from the diffuser into the gas discharge channel member.

The invention preferably provides the inflator for a restraining system for a vehicle, wherein, in an outer surface of the diffuser, one or two or more convex steps, continuous in a circumferential direction thereof, are provided to form two or three or more convex surfaces having different outer diameters from each other, and the outer diameter of the convex surfaces is set such as to increase from one end portion of the diffuser toward the other end portion thereof;

in an inner surface of the gas discharge channel member, one or two or more concave steps, continuous in a circumferential direction thereof, are provided to form two or three or more concave surfaces having different inner diameters from each other, and the inner diameter of the concave surfaces is set such as to increase from one end portion of the gas discharge channel member toward the other end portion thereof; and the diffuser and the gas discharge channel member are fixed in a state in which the one or two or more convex steps and the one or two or more concave steps are brought into contact with each other.

By using such diffuser and gas discharge channel member, the side of the diffuser that has the smallest outer diameter can be inserted from the side of the gas discharge channel member that has the largest inner diameter. Therefore, the assembling operation is facilitated. Further, because the insertion may be carried out so that the convex step mates with the concave step, the alignment in the axial direction is facilitated. As a result, the alignment of the communicating gas discharge hole and gas-introducing port is also facilitated. The sealing member such as an O-ring can be disposed both in two, or three or more convex surfaces and two, or three or more concave surfaces or only in the surfaces of one kind.

In the inflator in accordance with the present invention, the diffuser integrated with the inflator housing and the gas discharge channel member that forms a discharge path for the gas discharged from the diffuser are connected and fixed by a fixing ping. Therefore, the attachment structure is simple and the attachment operation is easy to perform.

Figure 1:
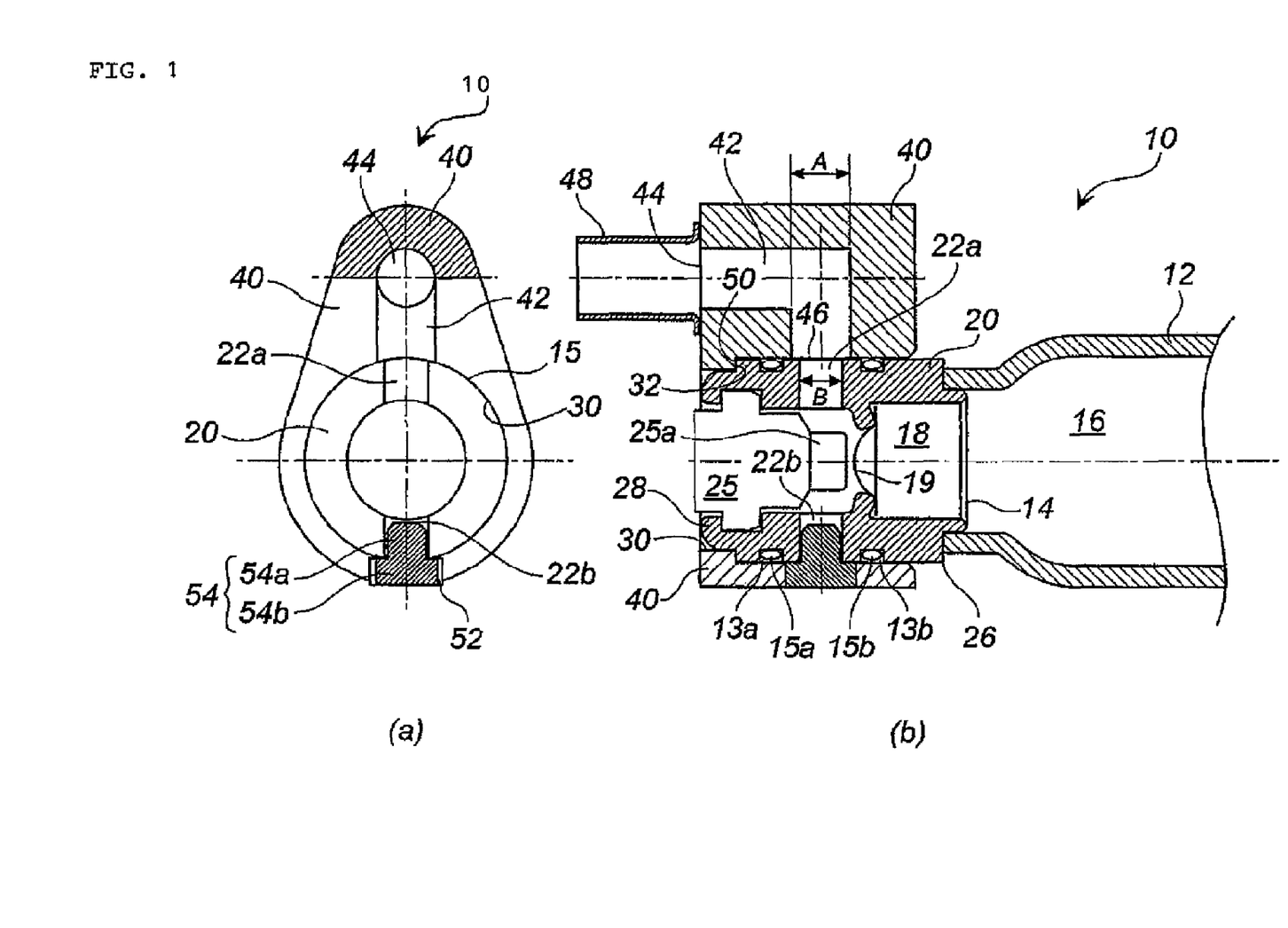
FIG. 1(a) shows a cross-sectional view in the width direction of the inflator in accordance with the present invention.
FIG. 1(b) shows a partial cross-sectional view in the axial direction of the inflator in accordance with the present invention.

Embodiments of Invention (1) Inflator shown in FIG. 1

FIG. 1(a) is a cross-sectional view in the width direction of the inflator (an igniter and a rupture plate are not shown), and FIG. 1(b) is a partial cross-sectional view in the axial direction of the inflator. The inflator shown in FIG. 1 can be used as an inflator for a curtain airbag using a pressurized gas as a gas generation source.

In an inflator 10, an inflator housing 12 has an opening 14 at one end thereof, whereas the other end is closed (not shown in the drawing). An internal space 16 of the inflator is filled with a pressurized gas including an inert gas such as argon, helium, or nitrogen. The inflator housing 12 has a round cross section in the width direction. The same is true for the opening 14.

A diffuser 20 is connected to the opening 14 of the inflator housing 12, and two gas discharge holes 22a, 22b for causing the pressurized gas to flow to the outside are formed in opposing positions at the circumferential surface of the diffuser 20.

The inflator housing 12 and the diffuser 20 are joined together by welding in a welded portion 26. Such joining may be performed not only by welding, but also by tightening with screws.

A pressurized gas outflow path 18 for discharging the pressurized gas located inside the space 16 is formed inside the diffuser 20, and this path is closed with a rupture plate 19 prior to actuation. As a result, the internal space 16 is maintained in a high-pressure air-tight state.

An igniter 25 provided with an ignition agent is accommodated, to break the rupture plate 19, in the diffuser 20. The igniter 25 is disposed after the inflator housing 12 has been attached to the diffuser 20 having the rupture plate 19 and the internal space 16 has been filled with the gas. The igniter is inserted and fitted from an opening at one end of the diffuser 20 (opening at the left side as shown in the drawing) in the direction toward the rupture plate 19, and the inserted igniter is fixed by crimping a peripheral edge 28 formed in the opening at one end of the diffuser 20. The igniter is arranged such that the actuation portion 25a including the ignition agent of the igniter 25 faces the rupture plate 19. The rupture plate 19 is deformed into a bowl-like shape toward the actuation portion 25a by the gas charged into the internal space 16.

The igniter 25 and the rupture plate 19 are attached coaxially with the central axis of the inflator housing 12, the rupture plate 19 is broken by combustion products (shock wave, high-temperature gas, flame, or the like) generated by the operation of the igniter 25, and the pressurized gas located inside the inner space 16 is released and discharged.

A gas discharge channel member 40 is attached to the outer surface of the diffuser 20. The gas discharge channel member 40 has a gas-introducing port 46 that is directly linked to the gas discharge hole 22a, and a gas outlet port 44 on the opposite side of the gas-introducing port 46, and also has a gas discharge path 42 between the gas-introducing port 46 and gas outlet port 44. The diameter A of the gas-introducing port 46 is larger than the diameter B of the gas discharge hole 22a.

The gas outlet port 44 is connected to a gas introducing port of an air bag, but if necessary, a tubular guide pipe 48 may be attached to the gas outlet port 44 and the guide pipe 48 may be connected to the air bag.

The gas discharge channel member 40 has a through hole 30 into which the diffuser 20 is inserted, and a concave step 32 is formed in the inner surface of the through hole 30. The inner diameter of the inner surface of the through hole 30 changes at the concave step 32, the inner diameter being smaller on the side of the gas outlet port 44 and larger in the other zone.

A convex step 50 is formed on the outer surface of the diffuser 20 to correspond with the concave step 32. The outer diameter of the outer surface of the diffuser 20 changes at the convex step 50, the outer diameter being smaller on the side of the peripheral edge 28 and larger in the other zone.

The gas discharge channel member 40 has a pin-introducing port 52 in a position opposite the gas-introducing port 46. The pin-introducing port 52 and the gas discharge hole 22b are linked to form a single hole, and a fixing pin 54 is inserted into this single hole.

The fixing pin 54 has a distal end portion 54a and an enlarged portion 54b. The outer diameter of the distal end portion 54a is equal to or slightly larger than the inner diameter of the gas discharge hole 22b, and the outer diameter of the enlarged portion 54b of the fixing pin 54 is slightly smaller than the inner diameter of the pin-introducing port 52. Therefore, by tightly fitting the distal end portion 54a of the fixing pin into the gas discharge hole 22b and positioning the enlarged portion 54b of the fixing pin inside the pin-introducing port 52, the diffuser 20 and the gas discharge channel member 40 are connected and fixed and the gas discharge channel member 40 is prevented from moving in the axial direction and circumferential direction.

Two annular grooves 13a, 13b are formed on the outer circumferential surface of the diffuser 20. The grooves 13a, 13b are formed continuously in the circumferential direction in positions sandwiching the gas discharge holes 22a, 22b from both sides, and O-rings 15a, 15b are fitted into the grooves. Air tightness of the contact surfaces of the diffuser 20 and the gas discharge channel member 40 is increased by the O-rings 15a, 15b.

A method of attaching the diffuser 20 to the gas discharge channel member 40 will be described below. When the diffuser 20 and the gas discharge channel member 40 are attached to each other, the O-rings 15a, 15b are fitted into the two annular grooves 13a, 13b and the diffuser 20 is inserted into the through hole 30 of the gas discharge channel member 40. At this time, the peripheral edge 28 of the diffuser 20 (where the igniter 25 is disposed) is inserted from an opening on the side opposite the gas outlet port 44, and the insertion is stopped when the convex step 50 abuts against the concave step 32. Then, the fixing pin 54 is inserted into the gas discharge hole 22b and the pin-introducing port 52 to connect and fix the diffuser 20 and the gas discharge channel member 40.

The attachment of the gas discharge channel member 40 to the diffuser 20 is performed immediately before the inflator 10 is connected to the airbag, and it is preferred that the gas discharge channel member 40 be not attached at a stage of transportation or storage of the inflator 10. The same is true for the below-described embodiments.

The operation of the inflator 10 shown in FIG. 1 will be described below. When the vehicle undergoes an impact, a signal is received from an impact sensor (not shown in the drawings), the igniter 25 is actuated, and the ignition agent is ignited and combusted. The rupture plate 19 is broken by the combustion products. The outflow path 18 is opened by the breakage of the rupture plate 19, and the pressurized gas located inside the internal space 16 is discharged via the gas discharge path 42 from the gas outlet port 44 (or outlet port of the guide pipe 48) and inflates the airbag.

Figure 2:
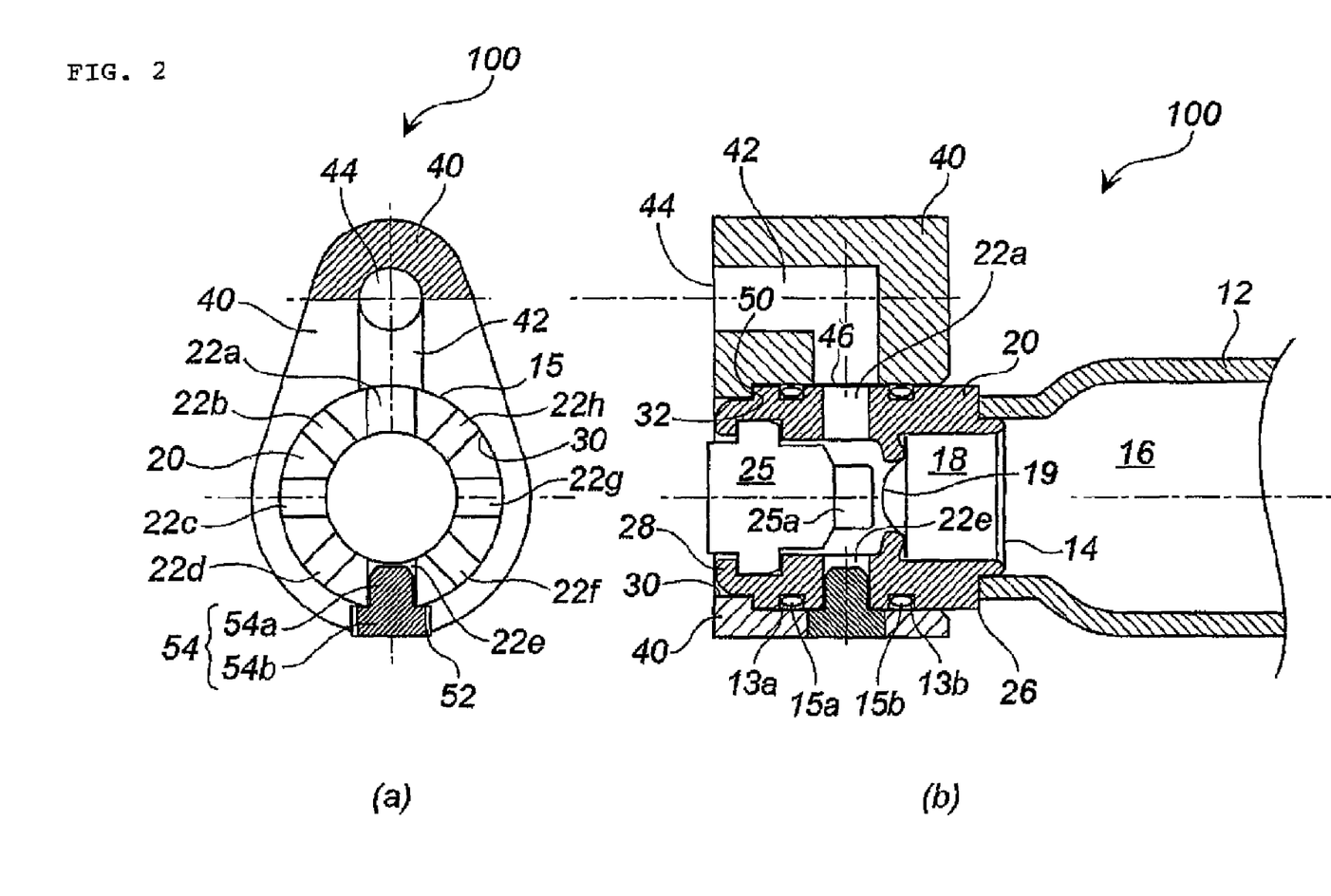
FIG. 2(a) shows a cross-sectional view in the width direction of the inflator in accordance with the present invention.
FIG. 2(b) shows a partial cross-sectional view in the axial direction of the inflator in accordance with the present invention.

(2) Inflator shown in FIG. 2

FIG. 2(a) is a cross-sectional view in the width direction of the inflator (an igniter and a rupture plate are not shown), and FIG. 2(b) is a partial cross-sectional view in the axial direction of the inflator. The inflator shown in FIG. 2 can be used as an inflator for a curtain airbag using a pressurized gas as a gas generation source.

An inflator 100 shown in FIG. 2 is identical to the inflator 10 shown in FIG. 1, except that the number of gas discharge holes of the diffuser 20 is different. Thus, the inflator 100 has eight gas discharge holes 22a-22h formed equidistantly (at an angle of 45°) in the periphery of the diffuser 20. The gas discharge holes 22a-22h have the same diameter.

Referring to FIG. 2(a), only the gas discharge hole 22a communicates with a gas-introducing port 46 of the gas discharge channel member 40, the gas discharge hole 22e communicates with a pin-introducing port 52, and a fixing pin 54 is inserted. Because the gas discharge holes 22a-22h are disposed equidistantly, communication of each of opposing two gas discharge holes with each of the gas-introducing port 46 and the pin-introducing port 52 can be established. In other words, one of two opposing gas discharge holes communicates with the gas-introducing port 46 and the other communicates with the pin-introducing port 52. The gas discharge holes 22b-22d, 22f-22h are substantially closed by the gas discharge channel member 40.

Figure 3:
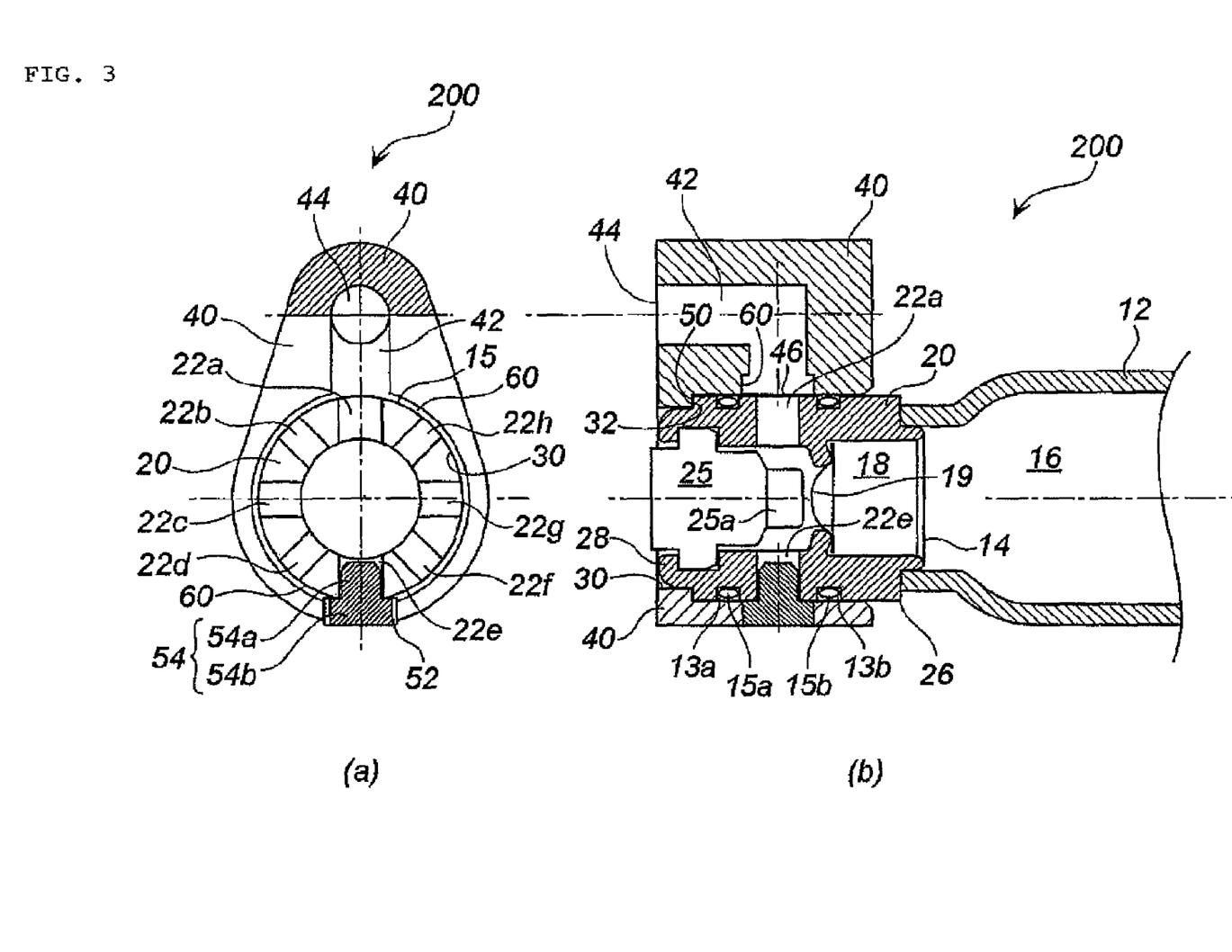
FIG. 3(a) shows a cross-sectional view in the width direction of the inflator in accordance with the present invention.
FIG. 3(b) shows a partial cross-sectional view in the axial direction of the inflator in accordance with the present invention.

(3) Inflator shown in FIG. 3

FIG. 3(a) is a cross-sectional view in the width direction of the inflator (an igniter and a rupture plate are not shown), and FIG. 3(b) is a partial cross-sectional view in the axial direction of the inflator. The inflator shown in FIG. 3 can be used as an inflator for a curtain airbag using a pressurized gas as a gas generation source.

An inflator 200 shown in FIG. 3 is identical to the inflator 10 shown in FIG. 1, except that the number of gas discharge holes in the diffuser 20 is different and an annular passage 60 linking the gas discharge holes in the circumferential direction is provided.

The inflator 200 has eight gas discharge holes 22a-22h formed equidistantly (at an angle of 45°) in the periphery of diffuser 20. The gas discharge holes 22a-22h have the same diameter.

Referring to FIG. 3, the gas discharge hole 22a communicates directly with a gas-introducing port 46 of a gas discharge channel member 40, the gas discharge hole 22e communicates with a pin-introducing port 52, and a fixing pin 54 is inserted. As shown in FIG. 3(a), an enlarged portion 54b of the fixing pin may be fixed so as to be inserted as far as an annular passage 60.

The gas discharge holes, other than the gas discharge hole 22e into which the fixing pin 54 is inserted, are linked together by the annular passage 60. The annular cross section area of the annular passage 60 is larger than the total opening surface area of the gas discharge holes 22a-22h.

Because the gas discharge holes 22a-22h are disposed equidistantly, communication of each of opposing two gas discharge holes with the gas-introducing port 46 and the pin-introducing port 52 can be established. That is, one of two opposing gas discharge holes communicates with the gas-introducing port 46 and the other communicates with the pin-introducing port 52.

During operation, the gas is discharged from the gas discharge holes 22a-22h (with the exception of the gas discharge hole 22e), but the gas that passed through the gas discharge hole 22a flows directly out of the gas-introducing port 46 and is discharged from the gas outlet port 44, whereas the gas that passed through the gas discharge holes 22b-22d, 22f-22h flows out to the gas-introducing port 46 via the annular passage 60 and is then discharged from the gas outlet port 44.

Figure 4:
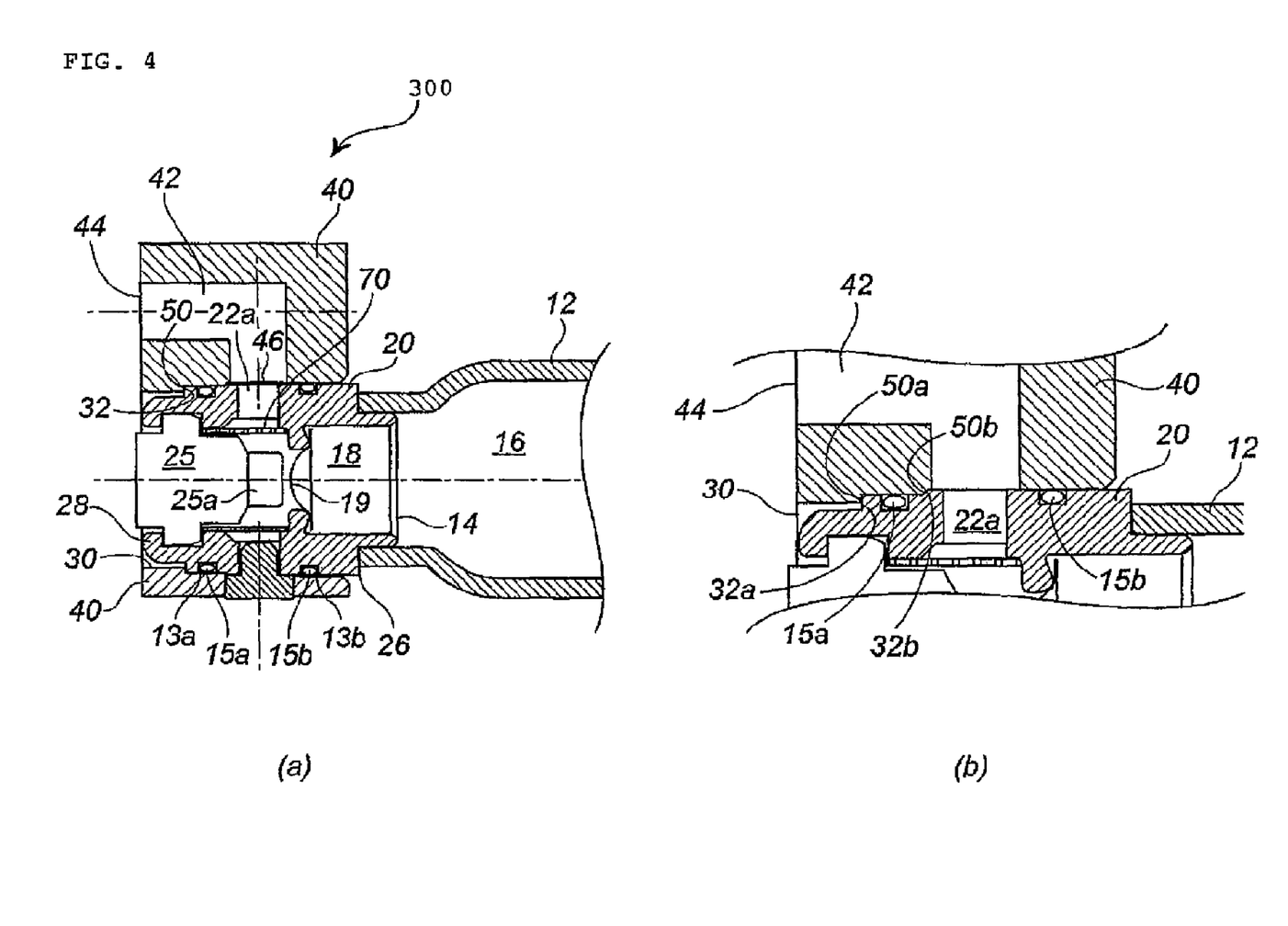
FIG. 4(a) shows a partial cross-sectional view in the axial direction in the inflator in accordance with the present invention.
FIG. 4(b) shows a partial enlarged view of FIG. 4(a).

(4) Inflator shown in FIG. 4

FIG. 4(a) is a partial cross-sectional view in the axial direction of the inflator, and FIG. 4(b) is a partial enlarged view of the cross-section shown in FIG. 4(a). The inflator shown in FIG. 4 can be used as an inflator for a curtain airbag using a pressurized gas as a gas generation source.

An inflator 300 shown in FIG. 4 is identical to the inflator 10 shown in FIG. 1, except that the shapes of the outer surface of diffuser 20 and the inner surface of gas discharge channel member 40 (through hole 30) are different. A screen 70 is a wire mesh for catching the fragments of the rupture plate 19 and can be attached, if necessary.

A first concave step 32a and a second concave step 32b are formed in the positions spaced from each other in the axial direction on the inner surface of the through hole 30 of the gas discharge channel member 40. The inner diameter of the through hole 30 varies at the first concave step 32a and at the second concave step 32b. The smallest inner diameter is between the end portion on the side of the gas outlet port 44 and the first concave step 32a, the largest inner diameter is between the second concave step 32b and the opposite end portion (side of the inflator housing 12), and the intermediate inner diameter is between the first concave step 32a and the second concave step 32b. Therefore, the inner diameter increases in three stages from the gas outlet port 44 toward the opposite end portion.

A first convex step 50a and a second convex step 50b are formed so as to correspond with the first concave step 32a and the second concave step 32b in the outer surface of the diffuser 20. The outer diameter of the diffuser 20 varies at the first convex step 50a and at the second convex step 50b. The smallest outer diameter is between a peripheral edge 28 and the first convex step 50a, the largest outer diameter is between the second convex step 50b and the opposite end portion (side of the inflator housing 12), and the intermediate outer diameter is between the first convex step 50a and the second convex step 50b. Therefore, the outer diameter increases in three stages from the peripheral edge 28 toward the opposite end portion.

A method for attaching the diffuser 20 to the gas discharge channel member 40 in the inflator 300 will be described below. When the diffuser 20 and the gas discharge channel member 40 are attached, the O-rings 15a, 15b are fitted into the two annular grooves 13a, 13b and the diffuser 20 is inserted into the through hole 30 of the gas discharge channel member 40. At this time, the peripheral edge 28 side of the diffuser 20 (where the igniter 25 is attached) is inserted from an opening on the side opposite the gas outlet port 44, and the insertion is stopped when the first convex step 50a abuts against the first concave step 32a and the second convex step 50b abuts against the second concave step 32b. Then, the fixing pin 54 is inserted into the gas discharge hole 22b and pin-introducing port 52 to connect and fix the diffuser 20 and the gas discharge channel member 40. With such a structure, when the gas discharge channel member 40 is installed, a sliding distance for O-ring 15a with contact to an inner surface of the gas discharge channel member 40 is short, thereby further facilitating the assembling operation.

In the embodiments shown in FIG. 1 to FIG. 4, inflators are described in which the diffuser is formed separately from the inflator housing, but the inflator may also have a structure in which a gas discharge hole is formed in part of the housing, as disclosed, for example, in U.S. Pat. No. 5,573,271. Further, the embodiments are explained in which the gas discharge channel member is fixed to the inflator using only the pressurized gas, but when a hybrid inflator (the inflator using both the pressurized gas and the solid gas generating agent) is used as the inflator, an inner structure disclosed in U.S. Pat. No. 5,230,531 or the structure disclosed in JP-A No. 2003-011769 can be used. Further, when the inflator employing only a solid gas generating agent is used, the structure disclosed in JP-A No. 2005-178643 can be used.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An inflator for a restraining system for a vehicle, comprising:
    an inflator housing storing a gas generation source;
    a diffuser having a first gas discharging hole and a second gas discharging hole provided in opposing locations of an outer circumferential surface thereof;
    a gas discharge channel member including a gas-introducing port and a pin-introducing port, and being attached to cover the outer circumferential surface of the diffuser, such that the first gas discharge hole and the second gas discharge hole communicate with the gas-introducing hole and the pin-introducing port, respectively; and a fixing pin inserted into the pin-introducing port and the second gas discharge hole, such that the gas discharge channel member is fixed to the diffuser.

2. The inflator for a restraining system for a vehicle according to claim 1, wherein a diameter of the first gas discharge hole of the diffuser is smaller than a diameter of the gas-introducing port of the gas discharge channel member.

3. The inflator for a restraining system for a vehicle according to claim 1, wherein the first gas discharging hole and the second gas discharging hole extend in a radial direction of the diffuser.

4. The inflator for a restraining system for a vehicle, comprising:
   an inflator housing storing a gas generation source;
   a diffuser having a plurality of gas discharge holes provided equidistantly in an outer circumferential surface thereof;
   a gas discharge channel member including a as-introducing port and a pin-introducing port, and being attached to cover the outer peripheral surface of the diffuser, such that one of the plurality as discharge ports communicates with the pin-introducing port; and
   a fixing pin inserted into the pin-introducing port and the one of the plurality of gas discharge holes, such that the gas discharge channel member is fixed to the diffuser, wherein
   an annular gas passage is formed in a circumferential direction between the diffuser and the gas discharge channel member, and
   the annular gas passage communicates with another one of the plurality of gas discharge holes.

5. The inflator for a restraining system for a vehicle according to claim 4, wherein, in a surface where the outer circumferential surface of the diffuser and an inner surface of the gas discharge channel member are in contact with each other, an annular groove continuous in a circumferential direction of the diffuser is formed in one of the outer circumferential surface of the diffuser and the inner surface of the gas discharge channel member, and a sealing material is disposed in the annular groove.

6. The inflator for a restraining system for a vehicle according to claim 4, wherein a diameter of the another of the gas discharge holes of the diffuser is smaller than the diameter of the gas-introducing port of the gas discharge channel member communicating with the another of the gas discharge holes.

7. The inflator for a restraining system for a vehicle according to claim 4, wherein,
   at least one convex step, formed continuously in a circumferential direction of the an outer surface of the diffuser, is provided in the outer circumferential surface of the diffuser, such that the outer diameter of the diffuser is set to increase from one end portion of the diffuser toward the other end portion thereof;
   at least one concave step, formed continuously in a circumferential direction of an inner surface of the gas discharge channel member, such that an inner diameter of the discharge channel member is set to increase from one end portion of the gas discharge channel member toward the other end portion thereof; and
   the diffuser and the gas discharge channel member are fixed in a state in which the at least one convex step and the at least one concave step are brought into contact with each other.

8. The inflator for a restraining system for a vehicle according to claim 4, wherein each of the plurality of gas discharge holes extends a radial direction of the diffuser.

9. An inflator for a restraining system for a vehicle, comprising:
   an inflator housing storing a gas generation source;
   a diffuser having a plurality of gas discharging holes provided equidistantly in an outer circumferential surface thereof;
   a gas discharge channel member including a gas-introducing port and a pin-introducing port, and being attached to cover the outer circumferential surface of the diffuser, such that one of the plurality of gas discharge holes communicates with the pin-introducing port, another of the plurality of gas discharge ports communicates with the gas-introducing port, and remainder of the plurality of gas discharge holes are closed by an inner surface of the gas discharge channel member; and
   a fixing pin inserted into the pin-introducing port and the one of the plurality of gas discharge holes, such that the gas discharge channel member is fixed to the diffuser.

10. The inflator for a restraining system for a vehicle according to claim 9, wherein the gas-introducing port and the pin-introducing port are formed at opposing locations.

11. The inflator for a restraining system for a vehicle according to claim 9, wherein each of the plurality of gas discharge holes extends a radial direction of the diffuser.

* * * * *